June 6, 1961 T. W. MERRITT ET AL 2,987,294
VALVE
Filed Dec. 23, 1957 3 Sheets-Sheet 2
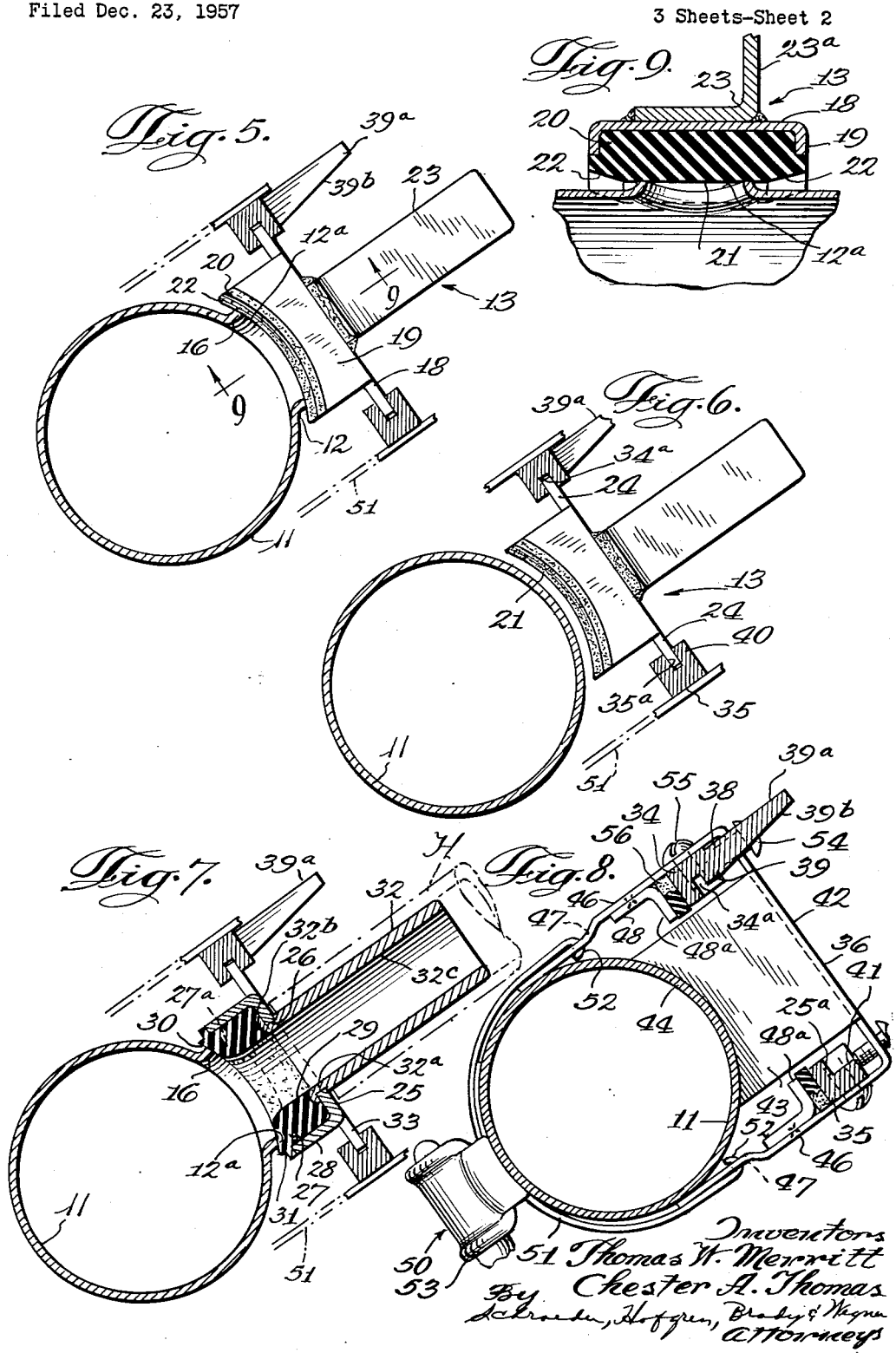
Inventors
Thomas W. Merritt
Chester A. Thomas
By Schroeder, Hofgren, Brady & Wegner
Attorneys

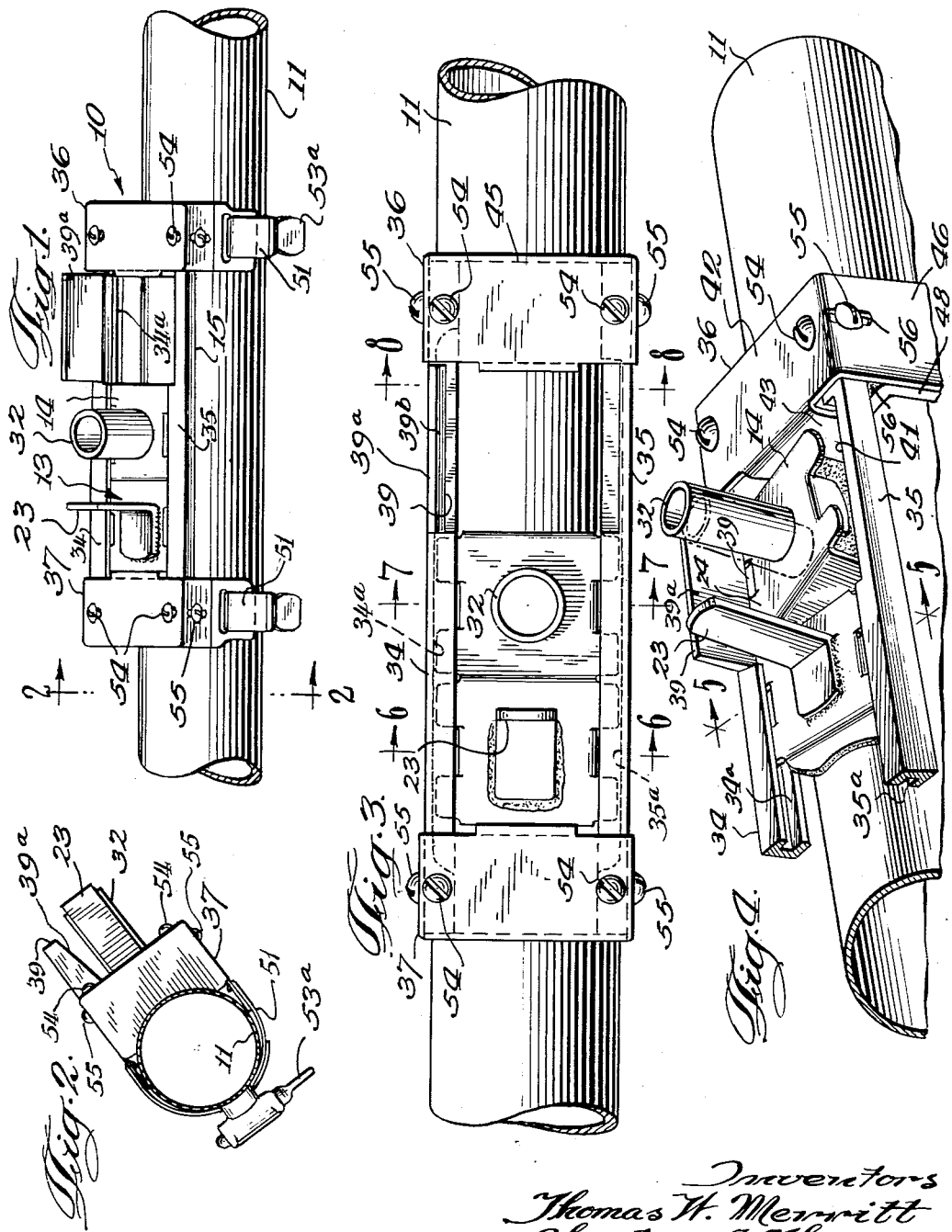

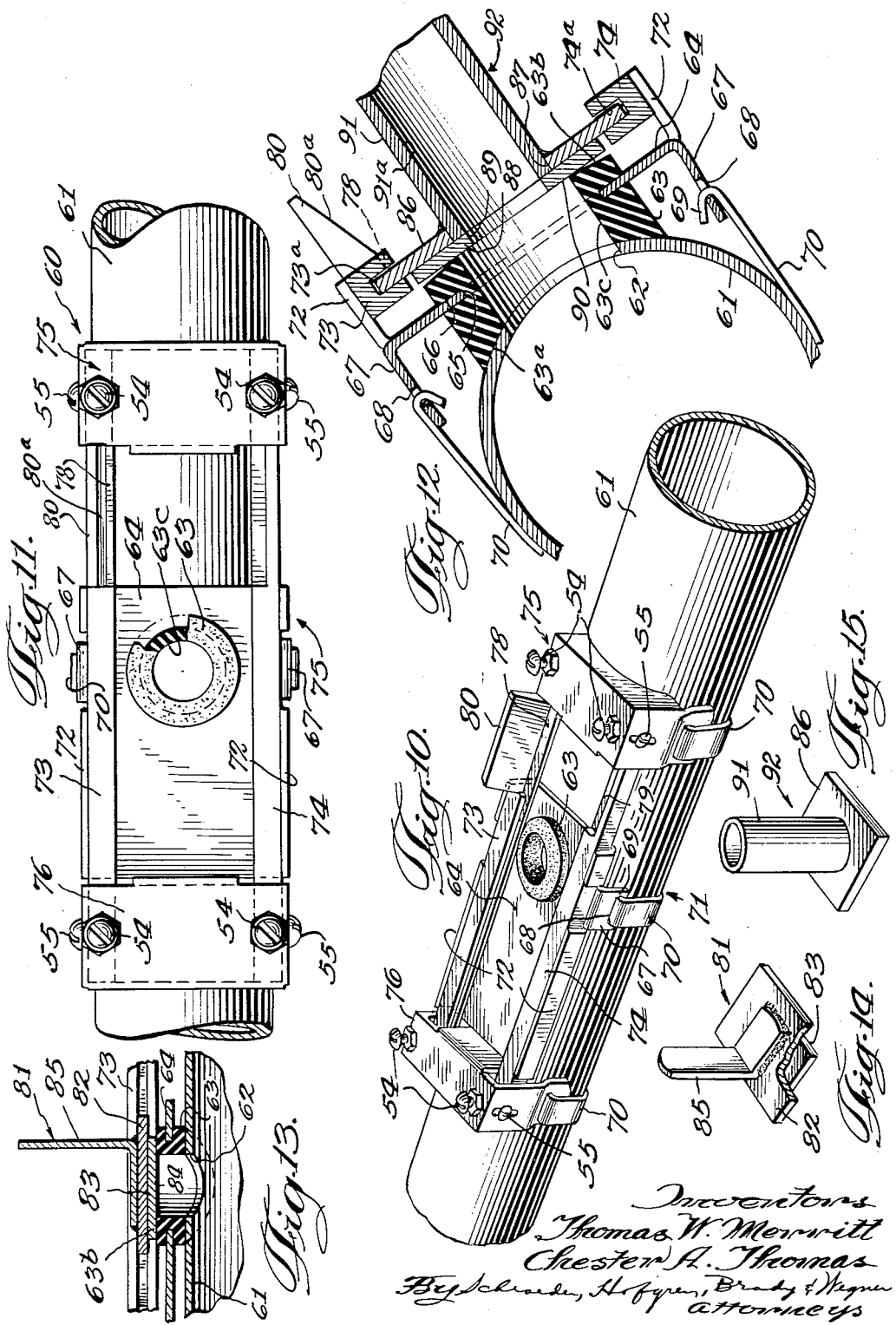

# United States Patent Office 2,987,294
Patented June 6, 1961

2,987,294
VALVE
Thomas W. Merritt, St. Charles, and Chester A. Thomas, Lake Forest, Ill., assignors to Babson Bros. Co., a corporation of Illinois
Filed Dec. 23, 1957, Ser. No. 704,430
21 Claims. (Cl. 251—146)

This invention relates to a valve and, in particular, to a valve for use on a carry-away milk pipe line.

In milking systems utilizing a carry-away pipe line, means are provided to connect the flexible hose leading from the milk withdrawing apparatus to the pipe line. Such pipe lines are normally operated at a reduced pressure and, thus, the means for connecting the hose must be of vacuum maintaining construction. Further, when the hose is disconnected from the pipe line, means must be provided for sealingly closing the hose connecting means to maintain the vacuum in the pipe line.

Carry-away milk pipe lines are formed of sections of readily maintainable material as stainless steel or glass, and it has heretofore been difficult to provide a completely satisfactory connecting means for use therewith. Another problem encountered in the known connecting means is the accessibility to portions thereof by insects, such as flies, tending to contaminate the milk passed therethrough. Still another disadvantage in the known connecting means is the multiplicity of elements comprising the connecting means, this factor causing a problem in the maintenance of the equipment as well as in the positive functioning thereof.

The principal feature of this invention is the provision of a new and improved valve means for connecting a milker to a pipe line.

Another feature is the provision of such a valve which may be readily installed in an existing pipe line.

Yet another feature is the provision of such a valve arranged to eliminate substantially contamination of the liquid contacted surfaces by insects, such as flies.

A further feature is the provision of such connecting valve wherein the liquid is scraped from relatively movable elements of the connecting means whenever the elements are removed from a position across the opening of the milk pipe line.

A yet further feature is the provision of such connecting means wherein the elements are readily removable therefrom and installable therein and are arranged for ready maintenance.

Yet another feature is the provision of such connecting means including a guide mounted on the pipe line arranged to effect automatically alignment, with the opening of the pipe line, of elements arranged to effect a closure of the opening and the connection of the hose with the pipe line through the opening.

A yet further feature of the invention is the provision of such connecting means having readily adjustable guide means for adjustably positioning the closure and connecting elements relative to the valve seat to preclude vacuum or pressure leaks in the system.

Other features and advantages of this invention will be apparent from the following description taken in connection with the accompanying drawings wherein:

FIG. 1 is a perspective view of a connecting means embodying the invention, installed on a portion of a pipe line;

FIG. 2 is a transverse section taken substantially along the line 2—2 of FIG. 1;

FIG. 3 is an enlarged, top plan view thereof;

FIG. 4 is a fragmentary, perspective view thereof;

FIG. 5 is a transverse section taken substantially along the line 5—5 of FIG. 4;

FIG. 6 is a transverse section taken substantially along the line 6—6 of FIG. 3;

FIG. 7 is a transverse section taken substantially along the line 7—7 of FIG. 3;

FIG. 8 is a transverse section taken substantially along the line 8—8 of FIG. 3;

FIG. 9 is an enlarged fragmentary longitudinal section taken substantially along the line 9—9 of FIG. 5;

FIG. 10 is a perspective view of another form of connecting means embodying the invention;

FIG. 11 is a top plan view thereof, the closure and connecting elements thereof being removed;

FIG. 12 is an enlarged fragmentary transverse section thereof with the connecting element arranged to communicate with the opening in the pipe line;

FIG. 13 is a fragmentary longitudinal section thereof with the closure element arranged to close the opening of the pipe line;

FIG. 14 is a perspective view of the closure element with a portion thereof broken away; and FIG. 15 is a perspective view of the connecting element thereof.

In the exemplary embodiment of the invention, as disclosed in FIGS. 1 through 9 of the drawings, means for connecting a hose from a milk withdrawing apparatus (not shown) to a carry-away milk pipe line is shown to comprise a valve means generally designated 10 mounted upon a tubular duct 11 comprising a portion of the pipe line. Valve arrangement 10 comprises generally four portions, namely a valve seat means, generally designated 12, on duct 11, a closure member 13, a connecting member 14, and a guide means 15 arranged to be secured to duct 11 adjacent valve seat means 12. Closure member 13 and connecting member 14 are associated with guide means 15 for movement relative to valve seat means 12 so that, alternatively, closure member 13 may be extended closingly across the valve seat means and connecting member 14 may be associated with the valve seat means to effect communication therethrough with the interior of duct 11 and a hose H sealingly connected to the connecting member.

More specifically, pipe line portion 11 comprises a tubular duct preferably formed of a material such as stainless steel. The duct is provided with an opening 16 through a wall thereof, upstanding from the peripheral edge of which is the valve seat means 12 to define an outward extension of opening 16. As best seen in FIGS. 5 and 7, the axis of opening 16 is arranged at an inclination of substantially 40° to the horizontal. Valve seat 12 is extruded from duct 11, and the upward extension of the valve seat is relatively small, being preferably approximately 1/16". The outer end 12a of the valve seat defines a segmentally cylindrical seating surface.

As best seen in FIGS. 5, 6 and 9, closure member 13 comprises a plate 18 having depending flanges 19 arranged to retain a sealing block element 20 formed of resilient material such as rubber. Block 20 projects from flanges 19 to define a transverse, segmentally cylindrical sealing surface 21 complementary to outer end 12a of valve seat 12. As best seen in FIG. 9, the front and rear edges 22 of sealing surface 21 are bevelled to facilitate movement of the block 20 over outer end 12a of the valve seat.

Upstanding from plate 18 is a handle or thumb-piece 23 which may be secured thereto by means such as welding. Handle 23 may comprise an L-shaped member having an upright portion 23a thereof displaced somewhat from the transverse center line of the closure member. Longitudinal edge portions 24 of plate 18 form lateral extensions of the plate for coaction with guide means 15 as will be brought out more fully subsequently.

As best seen in FIGS. 4 and 7, connecting member 14 comprises a plate 25 generally similar to plate 18 of closure member 13, but having a central opening 26 therethrough. A sealing piece 27, formed of a resilient readily maintainable material such as rubber, is retained on plate 25 by means of depending flanges 28 and is provided with a central passage 29 aligned with opening 26 of the plate. Passage 29 is preferably radially smaller than opening 16 of the pipe line whereby the inner end of the sealing piece 27 defines an annular sealing surface 30 having a segmentally cylindrical cross section which is complementary to the outer end 12a of the valve seat. The transverse edges of sealing piece 27, as edge 27a, are bevelled similarly to the edges 22 of block 20. In addition, the longitudinal edges 31 may be undercut for use in cleaning the connecting member as will be described subsequently.

Upstanding from plate 25 is a tubular nipple 32 which is adapted to receive sealingly the end of hose H from suitable milk withdrawing apparatus (not shown). The inner end 32a of the nipple may be reduced to have a tight fit with plate 25 in opening 26 and may be swedged as at 32b to secure the nipple to the plate. The diameter of bore 32c of the nipple is the same as the diameter of passage 29 of the sealing piece 27 whereby a smooth joint therebetween is provided precluding collection of material therein and facilitating maintenance. The longitudinal edge portions 33 of plate 25 are extended laterally therefrom in a manner similar to the longitudinal edge portions 24 of plate 18 to co-operate similarly with the guide means 15 as will be described subsequently.

Guide means 15 comprises a pair of rails 34 and 35 mounted on pipe line 11 by means of a pair of end members 36 and 37 and extending longitudinally parallel thereto on opposite sides of opening 16. Rails 34 and 35 comprise channels having a U-shaped cross section opening towards each other. To improve facility of installation of the longitudinal edge portions 33 of the connecting member into slot 34a of rail 34, outer leg 38 of rail 34 is partially cut away to provide a recess 39 extending longitudinally away from end member 36 for a distance comparable to the longitudinal extent of each of closure member 13 and connecting member 14. Upstanding from rail 34 contiguous with recess 39 is a guide shoulder 39a having an inner guide surface 39b inclined into recess 39. The outer leg 40 of rail 35 is fully removed adjacent end member 36 over the extent thereof in alignment with recess 39 to define a recess 41 permitting lateral insertion of longitudinal edge portions 24 of closure member 13 and longitudinal edge portions 33 of connecting member 14 into the slot 35a of rail 35. Thus, as best seen in FIG. 8, adjacent end member 36, rail 34 has a J-shaped cross section and rail 35 has an L-shaped cross section. Over the remainder of their longitudinal extent the rails are substantially U-shaped in cross section, the slots 34 and 35 being adapted to receive the longitudinal edge portions 24 and 33 freely slidably therein to permit ready movement of the closure member 13 and connecting member 14 transversely across valve seat 12.

End members 36 and 37 are identical in construction; and the following description will, therefore, be limited to that of end member 36, it being understood that the description applies equally to end member 37. As best seen in FIGS. 1 through 4 and 8, the end member comprises a transverse portion 42, a longitudinally inner, depending wall portion 43 having a radially inner, arcuate end 44 adapted to engage the outer surface of pipe line 11. Depending from the longitudinally outer end of transverse portion 42 is an outer wall 45 adapted to extend into engagement with duct 11. Depending from the sides of portions 42 are a pair of legs 46 arranged to straddle the pipe line 11, each leg being provided with a transverse slot 47. Secured to pipe line 11 laterally inwardly of legs 46, is a pair of supports 48 each secured as by spot welding to the adjacent leg. A clamp 50 is provided for securing the end member to the pipe, and comprises a pair of straps 51 each having a hooked end 52 inturned through slots 47 in legs 46. A locking member 53 is provided, operable by means of a thumbpiece 53a to secure the straps tightly and fixedly about the lower portion of duct 11, thereby to secure the end member fixedly thereon.

Rails 34 and 35 are secured at their opposite longitudinal ends in end members 36 and 37 by means of a pair of screws 54 and 55. Screw 54 is threaded through transverse portion 42 of end member 36 to have its inner end bear against the outer leg of the associated rail. The outer end 48a of each of supports 48 is inturned to form a transversely extending flange and a mounting pad 56 formed of a resilient material, such as rubber, is installed between support end 48a and the rail. Thus, by adjustment of screws 54, the positioning of rails 34 and 35 relative to duct 11 may be readily controlled so that sealing surface 21 of closure member 13 and sealing surface 30 of connecting member 14 may be properly related to valve seat 12 when the closure member and connecting member are installed in the guide means. Screws 55 pass through slots 56 in end bracket legs 46, permitting adjustment of the position of the rails. After the rails are properly positioned, screws 55 are tightened, locking them in place.

To install and utilize valve means 10, guide means 15 is mounted on duct 11 by extending straps 51 around the duct and operating locking member 53 to secure the guide means rigidly in place with rails 34 and 35 extending longitudinally on opposite sides of opening 16 of the duct.

To assure the proper longitudinal positioning of guide means 15 relative to valve seat 12, closure member 13 and connecting member 14 are inserted into the guide means and moved therein until closure member 13 abuts the inner end wall of end member 37, as seen in FIG. 1. Connecting member 14 is maintained in abutment with closure member 13 and the guide means is adjusted positionally until nipple 32 of the connecting member is centered relative to the valve seat means 12. Clamps 50 are now tightened by means of thumbpieces 53a whereby guide means 15 is fixedly retained on the duct 11 in proper relationship to the valve seat.

In installing the closure member and connecting member in guide means 15, the closure and connecting members are moved into the slots of the rails 34 and 35 through the recesses 39 and 41 thereof adjacent end member 36. The method of installing these members is best seen in FIG. 4 wherein the connecting member 14 is shown as being installed in the guide means by insertion of one longitudinal edge portion 24 through recess 39 and into slot 34a of rail 34. The opposite longitudinal edge portion 24 of connecting member 14 is moved laterally into slot 35a of rail 35 by swinging the connecting member downwardly about the edge portion 24 in slot 34a. The weight of the hose H on the connecting member 14 pulls the lower edge down into place while the engagement between the upper edge portion 24 and slot 34a in rail 34 prevents the connector from falling out. Once the connecting member is fully installed in slots 34a and 35a, it may be moved longitudinally therethrough, such as to the position shown in FIGS. 1 and 2, into alignment with valve seat 12, automatically removing previously installed closure member 13 from a position across the valve seat. Milk may now be passed through connecting member 14, through opening 16 and into the interior of duct 11 to be carried away as desired. Because of the small spacing between sealing surface 21 of closure member 13 relative to the outer surface of duct 11, insects, such as flies, have no access to the closure member surface when it is thus removed from the valve seat; but the sealing surface 21 does not touch the pipe line, so that no contamination is picked up from it. Further, any milk which may have been deposited on surface 21 from the milk passing through the pipe line when the closure member 13 was extended across the valve seat is scraped off by the movement of the surface 21 laterally across the valve seat when the closure member is moved to the valve open position of FIGS 1 and 2.

In a stanchion milking arrangement a plurality of cows are positioned in pairs along the length of the pipe line. A valve arrangement 10 is provided in the pipe line adjacent each cow or pair of cows. When the cow or cows using a valve 10 have been milked, the connecting member 14 is removed from the valve with which it was associated during the milking operation and the connecting member, the hose H and the milk withdrawing apparatus being retained in association with the connecting member, is installed in another valve 10 associated with a different cow or cows to deliver the milk therefrom to the pipe line. The construction of valve 10 permits the ready successive association of hose H with each of the plurality of valves 10 while maintaining the valves and connecting member sanitary at all times.

To remove the connecting member from each valve 10, the operator need merely press against upright portion 23a of handle 23 to urge the closure member toward end member 36 until connecting member 14 abuts end wall 43 of the end member. The spacing of end member 36 from valve seat 12 is such that when the closure and connecting members are thus arranged, the closure member is automatically centered over the valve seat to effect a sealing closure of opening 16. Connecting member 14 is held on the rails by the engagement between upper edge portion 24 and slot 34a. Connecting member 14 may now be withdrawn from rails 34 and 35 by lateral movement of lower longitudinal edge portion 24 outwardly through recess 41.

Upon completion of the entire milking operation, it is desirable to remove the connecting member 14 for cleaning purposes and to close the pipe line so that suitable cleaning fluids may be passed therethrough. The connecting member may then be cleaned, preferably as a part of a "Cleaned In Place" or "CIP" system. In such systems, washing solution either flows continuously or is flushed back and forth through the milking equipment. The connecting members may be mounted in a suitable manifold, the washing solution passed over and through the member. The cutoff edges 31 of connecting member 14 form a seat on the sealing piece allowing the sealing piece to be inserted into such a manifold with the sealing surface 30 and passage 29 readily accessible to the washing solutions.

It should be noted that in valve arrangement 10, the nipple 32 is sealed directly to sealing piece 27 whereby the cleaning of the connecting member is facilitated. The novel arrangement of the valve, wherein accessibility to the sealing surface of the closure member by insects, such as flies, is prevented and the automatic scraping clean of the sealing surface thereof permit the satisfactory maintenance of this member by the "CIP" method. The maintenance of a proper closure seal or connecting seal by the closure member 13 and connecting member 14, respectively, with the valve seat 12 is facilitated by means of the adjusting screws 54 so that the closure or connection may be maintained leak-proof at all times.

Turning now to FIGS. 10 through 15, a second form of valve arrangement generally designated 60 may be seen. Valve arrangement 60 is generally similar to valve arrangement 10 but is modified for use with a duct or pipe line 61, of the conventional stainless steel or glass type, wherein the opening 62 thereof is defined by flush edges rather than the upstanding valve seat means 12 of valve arrangement 10. In valve arrangement 60, the valve seat is defined by an annular seat member 63 having an inner end 63a retained in sealing engagement with the outer surface of pipe line 61 around opening 62 by means of a retaining plate 64. Plate 64 is provided with a circular opening 65, the edges of which are received in an annular groove 66 in the annular seat 63. A pair of depending flanges 67 are arranged at opopsite sides of the plate, preferably in alignment with opening 65 and are each provided with a transverse slot 68 arranged to receive the inturned end 69 of a clamping strap 70 of a clamp 71 generally similar to clamp 50 of valve arrangement 10.

Upstanding from plate 64 along its longitudinal edges, is a pair of upright flanges 72 which engage the lateral outside surfaces of rails 73 and 74 of a guide means 75 generally similar to guide means 15 of valve arrangement 10. Plate 64 extends longitudinally from opening 62 in the pipe line 61 into abutment with an end member 76 of guide means 75. Thus, retaining plate 64 serves as a means for aligning the guide means 75 relative to opening 62 of the pipe line as the abutment of end member 76 with the longitudinal end of the retaining plate properly positions the end member with respect to the opening and effects alignment of the guide means transversely of the opening.

Adjacent the opposite end member 77, rails 73 and 74 are provided, respectively, with recesses 78 and 79 corresponding to recesses 39 and 41 of rails 34 and 35. Rail 73 is further provided with an upstanding guide shoulder 80 similar to guide shoulder 39c of valve 10, and having an inner guide surface 80a inclined to terminate in recess 78.

Closure member 81 of valve arrangement 60 comprises a transverse plate 82 having a width sufficient to extend across the space between rails 73 and 74 and into slots 73a and 74a thereof. Secured to the underside of plate 82 is a sealing piece 83 arranged to extend across the spring 63c in the valve seat and engage the outer surface 63b surrounding the opening. The inner surface 84 of sealing piece 83 defines a planar sealing surface and outer end 63b of the valve seat is preferably frustoconical to facilitate proper engagement of sealing surface 84 therewith as the closure member is moved over the valve seat. Upstanding from plate 82 is a handle 85 generally similar to handle 23 of closure member 13. Closure member 81 may be formed of a readily maintainable material, such as stainless steel, and valve seat 63 is preferably formed of a resilient material, such as rubber, which allows ready maintenance thereof.

Connecting member 92 of valve arrangement 60 comprises a plate 86 generally similar to plate 82 but having a central opening 87 therethrough. An annular sealing piece 88 is secured to the underside of plate 86 and is provided with a central opening 89 coaxially of opening 87 of plate 86 but having a slightly smaller diameter than the diameter of opening 87. Opening 89 is also preferably somewhat smaller in diameter than the bore 63c of the annular valve seat so that sealing piece 88 defines a sealing surface 90 extending across outer end 63b of the valve seat and somewhat radially inwardly therefrom.

Upstanding from plate 86 is a nipple 91 having a bore 91a having a diameter similar to the diameter of opening 89. Nipple 91 extends through opening 87 in plate 86 to abut sealing piece 88 and may be secured to plate 86 as by welding. The joint between nipple 91 and sealing piece 88 is smoothly finished to form an effectively continuous passage wall precluding collection of material therein and facilitating cleaning of the connecting member. In this regard, it should be noted that there is only a single joint between valve seat 63 and pipe line 61 whereby maintenance thereof is facilitated.

The spacing between annular groove 66 of annular valve seat 63 and the outer end 63b thereof is relatively small and preferably approximately 1/16". Thus, when closure member 81 is moved from the valve closing position across valve seat 63 to a valve open position wherein the closure member abuts end member 76, the space between the sealing surface 90 thereof and the retaining plate 64 is sufficiently small to preclude accessibility to the sealing surface by insects such as flies. Further, in moving the closure member to the valve open position, the sealing surface 90 is scraped clean by the action of outer end 63b of the valve seat thereagainst further maintaining the valve in a sanitary condition.

It should be noted that valve arrangement 60 provides the same desirable functioning as valve arrangement 10. Additionally, valve arrangement 60 permits the use of a pipe line 61 having a conventional flush opening therethrough in lieu of the formed valve seat means 12 of valve arrangement 10. In certain existing installations, valve arrangement 60 provides improved interchangeability.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. Flow control means of the character described for use with a carry-away milkline, comprising: a valve seat upstanding from a wall to define an outward extension of an opening; longitudinally extending guide means adjacent said valve seat; a closure member having a sealing surface and slidably carried in said guide means for movement between a position across said valve seat to close sealingly the opening, and another position laterally of said valve seat, such movement being along and generally parallel with said wall, the sealing surface of said valve member being spaced from said wall and free of contact with other surfaces when displaced from said first position; and a connecting member having a passage therethrough, an outer end for connecting a duct sealingly thereto, and an inner sealing piece, said connecting member being slidably carried in said guide means alternatively to engage said sealing piece with said valve seat to effect sealed communication of said passage and said opening and to be removed from said valve seat permitting said closure member to be disposed across the valve seat to seal the opening.

2. The device of claim 1, wherein the guide means comprises a pair of U-shaped channels opening toward each other and the closure member comprises a plate provided with opposite edges slidably received in said channels and having a depending block element which moves across the outer end of the valve seat.

3. The device of claim 1 wherein the guide means comprises a pair of U-shaped channels opening toward each other and the connecting member comprises a plate provided with opposite edges slidably received in said channels and having an upstanding tubular nipple for connecting a duct sealingly thereto, and a depending block portion having a passage therethrough and an inner face movable across the outer end of said valve seat.

4. The device of claim 1 wherein the valve seat comprises an annular member, and means are provided for securing sealingly the annular member to the wall.

5. Flow control means of the character described for use with a carry-away milkline, comprising: a valve seat upstanding from a wall to define an outward extension of said opening; longitudinally extending guide means; a closure member slidably carried in said guide means to be disposed alternatively across said valve seat to close sealingly the opening and laterally of said valve seat to permit access to the opening; and means for limiting accessibility to the surface of the closure member confronting the opening, when said closure member is disposed laterally of the valve seat, including a plate extending laterally from the valve seat and spaced from said closure member.

6. The device of claim 5 wherein the valve seat is retained by said plate.

7. The device of claim 5 wherein means are provided on said plate to effect proper positioning of said guide means relative to the valve seat.

8. The device of claim 7 wherein said means on said plate includes flanges upstanding from the longitudinal edges thereof.

9. The device of claim 7 wherein said means on said plate includes a transverse end portion thereof spaced longitudinally from the valve seat a predetermined distance, and said guide means includes a transverse end member arranged to abut said end portion.

10. The device of claim 5 wherein the plate is facially spaced from said surface of the closure approximately 1/16".

11. The device of claim 1 wherein the spacing of the closure member from the wall is approximately 1/16".

12. Flow control means of the character described for use with a carry-away milkline, comprising: a valve seat upstanding from a wall to define an outward extension of an opening; a pair of channels; a pair of end members retaining said channels; a closure member having portions slidably carried in said channels to dispose said member alternatively across said valve seat to seal the opening and laterally of said valve seat; and a connecting member having a passage therethrough and portions slidably carried in said channels to dispose said connecting member alternatively on said valve seat to effect communication of said passage and said opening, and to space said connecting member from said valve seat to permit said closure member to seal the opening.

13. The device of claim 12 wherein the channels are U-shaped in cross section and extend away from said valve seat a distance at least equal to the longitudinal extension of the closure and connecting members and the leg of one channel is cut away to have an L-shaped cross section over said distance and thereby define a slot permitting the insertion of one of said portions of said closure and connecting members thereinto.

14. The device of claim 13 wherein the other channel is provided with an upstanding shoulder extending in lateral alignment with said slot and having an inclined surface facing said slot adapted to guide another of said portions of said closure and connecting member into said other channel.

15. The device of claim 14 wherein the shoulder extends from the leg of said other channel said last named leg is partially cut away in lateral alignment with said slot whereby said channel has a U-shaped cross section.

16. The device of claim 13 wherein one end member extends transversely between the channels at the end of said slot most remote from the opening thereby to provide an abutment to guide the inserting and removing of said closure and connecting members relative to said channels.

17. The device of claim 16 wherein said one end member is spaced from the valve seat a distance equal to the longitudinal extension of the connecting member plus the spacing from said opening of an edge of the closure member closest to said one end member when the closure member is disposed across the valve seat to close the opening.

18. The device of claim 12 wherein means are associated with said end members to adjust the mounting of the channels relative thereto.

19. In a valve: a first elongated guide member having a longitudinal slot; a second elongated guide member extending parallel to and spaced from said first elongated member and having a slot, said members being arranged with said slots opening toward each other, said second member being further provided with a recess opening toward said first member and extending transversely through the second member to open into the slot therein; and a valve member having a first portion receivable in the slot of the first member and a second portion receivable in the slot of the second member, said valve member being swingable about said first portion when the same is received in the slot of the first member to permit the second portion to move laterally through said recess and into the slot of the second member.

20. In a valve: a first elongated guide member having a longitudinal slot; a second elongated guide member extending parallel to and spaced from said first elongated member and having a slot, said members being arranged with said slots opening toward each other, said second member being further provided with a recess opening toward said first member and extending transversely through the second member to open into the slot therein; a valve member having a first portion receivable in the slot of the first member and a second portion receivable in the slot of the second member, said valve member being swingable about said first portion when the same is received in the slot of the first member to permit the second portion to move laterally through said recess and into the slot of the second member; and a guide shoulder on one elongated member aligned with said recess to guide one of said portions of the valve member into the slot of said one elongated member.

21. Flow control means of the character described for use with a carry-away milkline, comprising: a valve seat aligned with an opening; a connector member having a milk hose secured thereto; a pair of rails mounted one above said valve seat and the other below, with grooves formed in the facing surfaces thereof, said connector member being slidably mounted in said grooves and movable into position on said valve seat, the groove in the lower rail extending only a portion of the length thereof to permit removal of the connector member, and the upper rail having a groove in the portion thereof opposite the portion of the lower rail having no groove.

References Cited in the file of this patent
UNITED STATES PATENTS

| | | | |
|---|---|---|---|
| 406,447 | Kennedy | July 9, | 1889 |
| 697,358 | Penner | Apr. 8, | 1902 |
| 713,935 | Arnold | Nov. 18, | 1902 |
| 1,066,150 | Reitz | July 1, | 1913 |
| 1,487,593 | Patton | Mar. 18, | 1924 |
| 1,872,792 | Neorr | Aug. 23, | 1932 |
| 1,959,517 | Barks | May 22, | 1934 |
| 1,989,131 | Dodge | Jan. 29, | 1935 |
| 2,146,336 | Frey | Feb. 7, | 1939 |
| 2,357,755 | Moll | Sept. 5, | 1944 |
| 2,779,608 | Abbey | Jan. 29, | 1957 |
| 2,783,771 | Thomas | Mar. 5, | 1957 |
| 2,881,010 | Bouma | Apr. 7, | 1959 |

FOREIGN PATENTS

| | | |
|---|---|---|
| 76,693 | Germany | of 1894 |